US008852752B2

(12) United States Patent
Cripsey et al.

(10) Patent No.: US 8,852,752 B2
(45) Date of Patent: Oct. 7, 2014

(54) FLOW FORMED DRUM WITH A RETENTION RING AND A SUBSTANTIALLY BURR FREE TOOTH PROFILE

(75) Inventors: Timothy J. Cripsey, Rochester, MI (US); Robert J. Herston, New Baltimore, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 235 days.

(21) Appl. No.: 13/348,204

(22) Filed: Jan. 11, 2012

(65) Prior Publication Data
US 2012/0177879 A1    Jul. 12, 2012

Related U.S. Application Data

(60) Provisional application No. 61/431,498, filed on Jan. 11, 2011.

(51) Int. Cl.
*B21D 22/16*    (2006.01)
*B21D 53/28*    (2006.01)
*B21H 5/02*    (2006.01)
*F16H 57/08*    (2006.01)
*F16H 48/06*    (2006.01)

(52) U.S. Cl.
CPC ............... *B21D 53/28* (2013.01); *B21H 5/025* (2013.01); *F16H 57/08* (2013.01); *F16H 48/06* (2013.01); *B21D 22/16* (2013.01)
USPC ............... 428/579; 428/600; 428/596; 72/85; 72/348; 475/331; 74/606 R; 192/69

(58) Field of Classification Search
None
See application file for complete search history.

(56) References Cited

U.S. PATENT DOCUMENTS

| 5,092,040 | A  | * | 3/1992 | Kato et al. ............... 29/894.324 |
| 6,105,410 | A  | * | 8/2000 | Sauberlich et al. ............... 72/71 |
| 6,530,253 | B1 |   | 3/2003 | Gotou et al. |
| 6,694,791 | B1 |   | 2/2004 | Johnson et al. |
| 6,863,636 | B2 |   | 3/2005 | Huber et al. |
| 7,021,171 | B2 |   | 4/2006 | Huber et al. |
| 7,213,435 | B2 |   | 5/2007 | Huber et al. |
| 7,328,492 | B2 |   | 2/2008 | Huber et al. |
| 7,341,539 | B2 |   | 3/2008 | Huber et al. |
| 7,721,409 | B2 | * | 5/2010 | Lindsay et al. ............... 29/557 |
| 7,766,575 | B2 |   | 8/2010 | Huber et al. |
| 2002/0040835 | A1 | * | 4/2002 | Fukukawa et al. ............ 192/3.28 |
| 2004/0035870 | A1 | * | 2/2004 | Sakaguchi et al. ............ 220/581 |

(Continued)

FOREIGN PATENT DOCUMENTS

JP    2002130322 A    5/2002
WO    2007027992       3/2007

*Primary Examiner* — John J Zimmerman
(74) *Attorney, Agent, or Firm* — Fraser Clemens Martin & Miller LLC; J. Douglas Miller

(57) ABSTRACT

A flow formed part includes a first end, a second end, and a side wall extending therebetween. A reinforcing member is disposed around the second end. The side wall has a profile formed along an inner surface of the side wall. The profile is adapted to be substantially burr free after windows are formed in the sidewall. A method of making a flow formed part includes the steps of disposing a preform on a tailstock, providing a plurality of rollers adjacent the tailstock, providing a mandrel having an outer surface including a plurality of alternating channels and protuberances, and causing the rollers to press the preform against the outer surface of the mandrel.

9 Claims, 4 Drawing Sheets

(56) References Cited

U.S. PATENT DOCUMENTS

| | | |
|---|---|---|
| 2005/0164823 A1* | 7/2005 | Huber et al. .................. 475/331 |
| 2006/0205560 A1* | 9/2006 | Meier ............................ 475/331 |
| 2009/0017962 A1* | 1/2009 | Isken et al. .................... 475/230 |
| 2009/0137357 A1 | 5/2009 | Meier et al. |
| 2009/0217725 A1* | 9/2009 | Cripsey et al. .................. 72/105 |
| 2010/0181822 A1* | 7/2010 | Nakamura et al. ....... 301/63.105 |
| 2011/0185782 A1 | 8/2011 | Cripsey et al. |
| 2011/0263374 A1 | 10/2011 | Cripsey et al. |
| 2011/0297503 A1* | 12/2011 | Szuba ............................ 192/108 |
| 2012/0000314 A1 | 1/2012 | Cripsey et al. |
| 2013/0264165 A1* | 10/2013 | Cripsey ........................... 192/69 |

* cited by examiner

FLOW FORMED DRUM WITH A RETENTION RING AND A SUBSTANTIALLY BURR FREE TOOTH PROFILE

CROSS-REFERENCE TO RELATED APPLICATIONS

This application claims the benefit of U.S. Provisional Application No. 61/431,498, filed on Jan. 11, 2011. The entire disclosure of the above application is hereby incorporated herein by reference.

FIELD OF THE INVENTION

The invention relates to a flow formed part, and more particularly to a flow formed drum having a retention ring and a substantially burr free tooth profile.

BACKGROUND OF THE INVENTION

Flow forming is a process used to produce a formed metal part. Flow forming is the use of metal forming lathes to extrude a blank or a preform prepared from a desired material into the formed metal part. Flow forming provides the features traditionally provided by a stamping process, while also providing the additional benefits of improved dimensional capabilities, work hardening up to three-times the desired material properties, and the ability to use the part after formation with limited or no additional machining required.

Post-processing associated with flow forming including, for example, forming windows in a flow formed part, may result in undesirable burrs and other surface flaws formed on the part. The burrs and other surface flaws must be removed, requiring additional machining steps. Therefore, the cost of production and the overall efficiency of the flow forming process are adversely affected.

It would be desirable to produce a flow formed metal part with a minimized number of burrs and/or other surface flaws, minimize machining and production costs of the metal part, and maximize an efficiency of the flow forming process. In particular, it would be desirable to produce a flow formed drum having a reinforcing member and a substantially burr free profile.

SUMMARY OF THE INVENTION

In concordance with the instant disclosure, a flow formed drum having a retention ring and a burr free tooth profile has surprisingly been discovered.

In one embodiment, a flow formed part has a first end, a second end disposed opposite the first end, and a side wall extending between the first end and the second end. The first end is substantially closed and the second end is open. The part further includes a reinforcing member disposed around the second end. The side wall may have an inner surface with a tooth profile that permits the formation of substantially burr free windows in the part.

In another embodiment, a method for making a flow formed part includes the steps of disposing a preform on a tailstock, providing a plurality of rollers adjacent the tailstock, and providing a mandrel having a first end adapted to receive the preform. The mandrel has a second end opposite the first end, and an outer surface including a plurality of alternating channels and protuberances extending therebetween. The rollers are caused to press the preform against the outer surface of the mandrel to form the flow formed part. The flow formed part is then removed from the mandrel. An integral reinforcing member is formed on the flow formed part by one of the flow forming process and a secondary manufacturing process such as stamping or machining.

In a further embodiment, a system for making a flow formed part includes a preform disposed on a tailstock, a plurality of rollers disposed adjacent the tailstock, and a mandrel. The mandrel includes a first end adapted to receive the preform when the rollers press the preform against the mandrel. The mandrel has a second end disposed opposite the first end, and an outer surface including a plurality of alternating channels and protuberances extending between the first end of the mandrel and the second end of the mandrel. The alternating channels and protuberances define a tooth profile of the flow formed part that permits the formation of substantially burr free windows and a retention member.

BRIEF DESCRIPTION OF THE DRAWINGS

The above, as well as other advantages of the present disclosure, will become readily apparent to those skilled in the art from the following detailed description of embodiments of the disclosure when considered in the light of the accompanying drawings in which.

DETAILED DESCRIPTION OF THE PREFERRED EMBODIMENT OF THE INVENTION

The following detailed description and appended drawings describe and illustrate exemplary embodiments of the disclosure. The description and drawings serve to enable one skilled in the art to make and use the disclosure, and are not intended to limit the scope of the disclosure in any manner. In respect of the methods disclosed and illustrated, the steps presented are exemplary in nature, and thus, the order of the steps is not necessary or critical.

Figure 1:
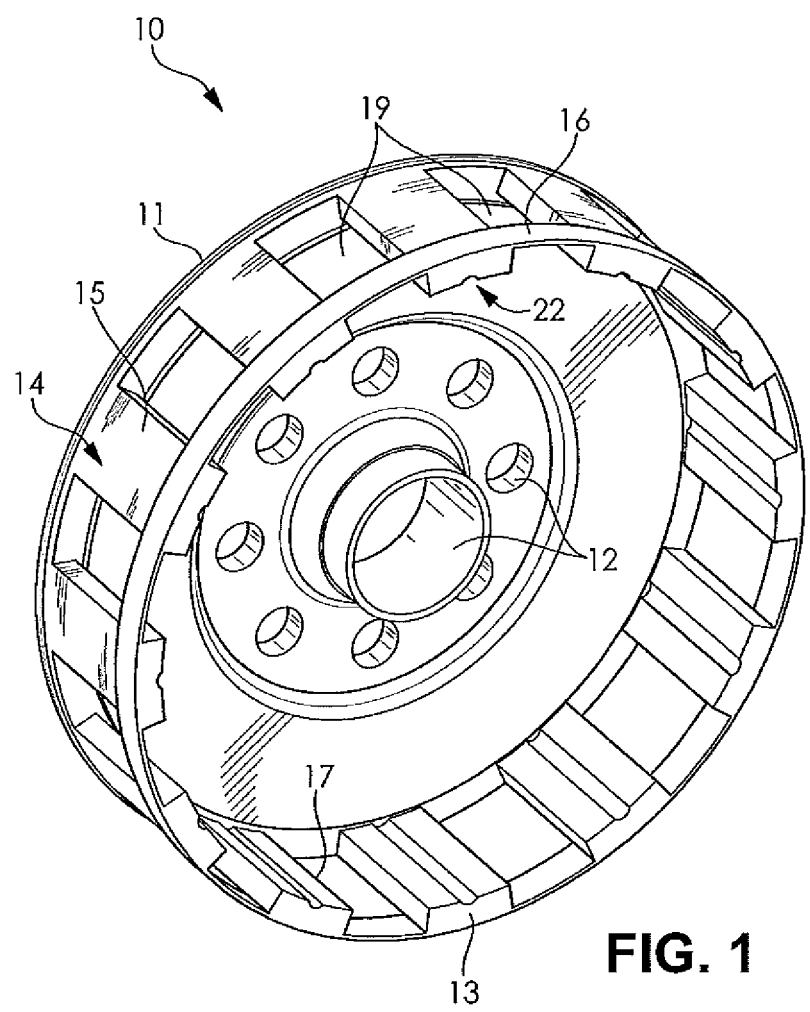
FIG. 1 is a perspective view of a flow formed part according to an embodiment of the disclosure.
Figure 2:
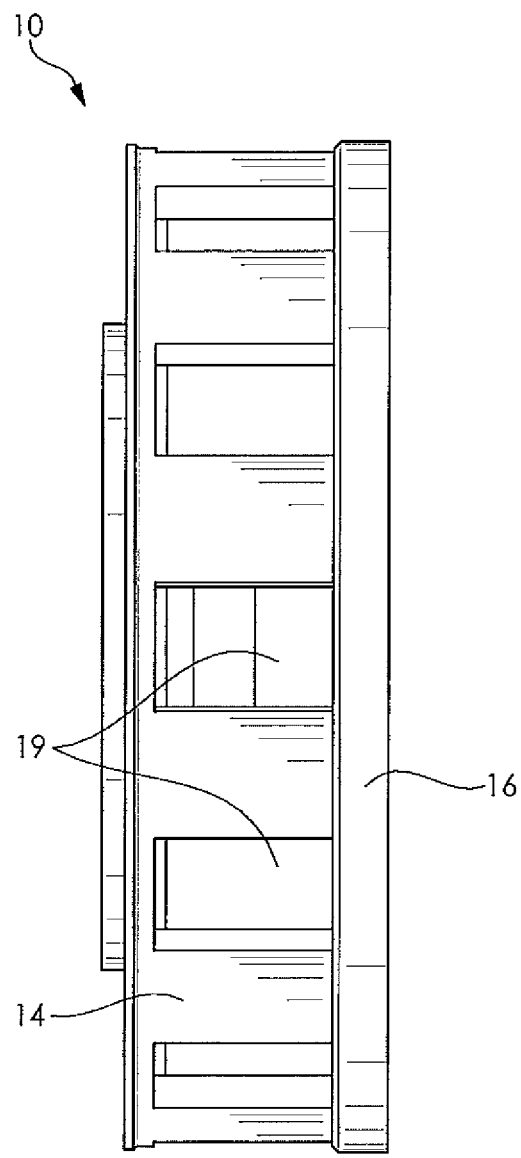
FIG. 2 is a side elevational view of the flow formed part of FIG. 1.
Figure 5:
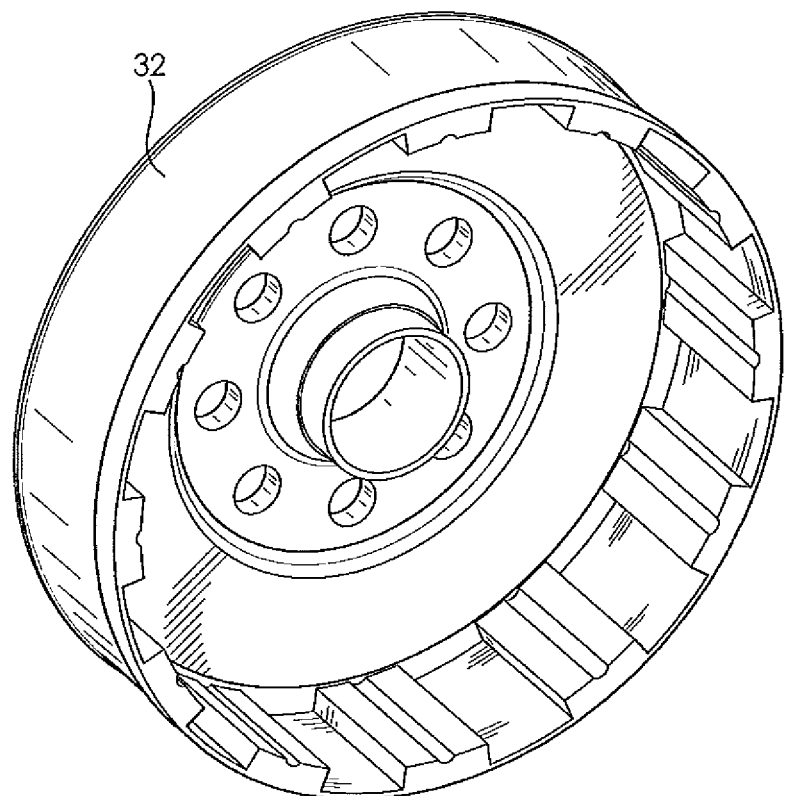
FIG. 5 is a perspective view of a flow formed part according to an embodiment of the disclosure, prior to post-processing formation of windows.

FIGS. 1, 2 and 5 show a flow formed part 10 according to an embodiment of the disclosure. The part 10 includes a first end 11 and a second end 13 opposite the first end 11. The first end 11 is substantially closed, and the second end 13 is open. The first end 11 may include one or more apertures 12. The part 10 further includes a side wall 14 extending between the first end 11 and the second end 13. The part 10 may be made from metal, plastic, or any other material capable of being flow formed. The shape of the part 10 is typically substantially cylindrical, but may be other shapes. In exemplary embodiments of the disclosure, the flow formed part 10 is a drum.

The side wall 14 may include a plurality of windows 19. The windows 19 may have a substantially rectangular shape, or any other desirable shape. The windows 19 may be formed by one of a punching process or a machining process, subsequent to the flow forming of the flow formed part 10.

A reinforcing member 16 is formed on one of the first and second ends 11, 13 of the part 10. Typically, the reinforcing member 16 is disposed on the second end 13 of the part 10 and is integrally formed with the side wall 14 or the second end 13 of the part 10. The reinforcing member 16 may be in the form of a retention ring. A diameter of the reinforcing member 16 may be greater than a diameter of the side wall 14. In other embodiment, the diameter of the reinforcing member 16 may be less than the diameter of the side wall 14. The reinforcing member 16 provides dimensional stability and strength to the part 10, by constraining the ends of the side wall 14 after the windows 19 are formed. The reinforcing member 16 is also sized so as to permit sufficient flow of cooling fluid through the large windows 19 in operation. The inside diameter of the reinforcement member 16 is also sized to allow for full use of the flow formed spines of the part 10.

The side wall 14 includes an outer surface 15 and an inner surface 17. A profile 22 is formed along the inner surface 17 of the side wall 14. The shape of the profile 22 is adapted to result in a substantially burr free part 10 after the windows 19 are formed, for example, by punching or machining. The profile 22 may include a plurality of alternating channels 21 and protuberances 23, also known as a "tooth profile". Each channel 21 may include a surface 25 that is substantially planar. The surface may also have a slight curvature or may be non-planar. Each channel 21 is integrally connected to an adjacent protuberance 23 by a rounded edge or corner. Typically, each protuberance 23 includes a surface 27 including a first portion extending outwardly from a channel 21, a second portion extending outwardly from another channel 21, and a third portion disposed between the first portion and the second portion that is substantially planar or has a slight curvature. The inner surface 17 between the first portion and the third portion and the second portion and the third portion forms a rounded edge or corner. The substantially planar portion of the surface 27 may include a concave portion 29 that curves inwardly into the inner surface 17. The surface 27 of each protuberance 23 may also be non-planar. An exemplary embodiment of the profile 22 is shown in FIG. 4.

Figure 4:
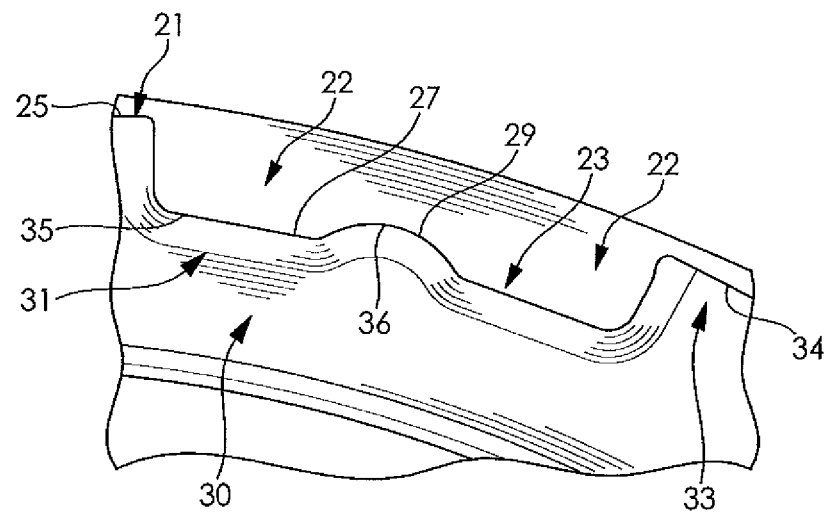
FIG. 4 is an enlarged fragmentary perspective view of a mandrel of the system depicted in FIG. 2 having a preform disposed thereon and pressed into the mandrel with rollers to form a flow formed part.

It should appreciated that the profile 22 provides a recess (shown substantially between the leader line arrowheads for 22 and 33 in FIG. 4, for example), that permits the machining of the windows 19 without forming burrs. The curvature of the recess is designed to minimize the burr generation during machining processes.

The part 10 is formed from a preform 24 by a flow forming process. The preform 24 may be a stamped plate, a hot forged plate, a flat plate (also known as a blank), or another type of preform suitable for use in a flow forming process, as desired.

Figure 3:
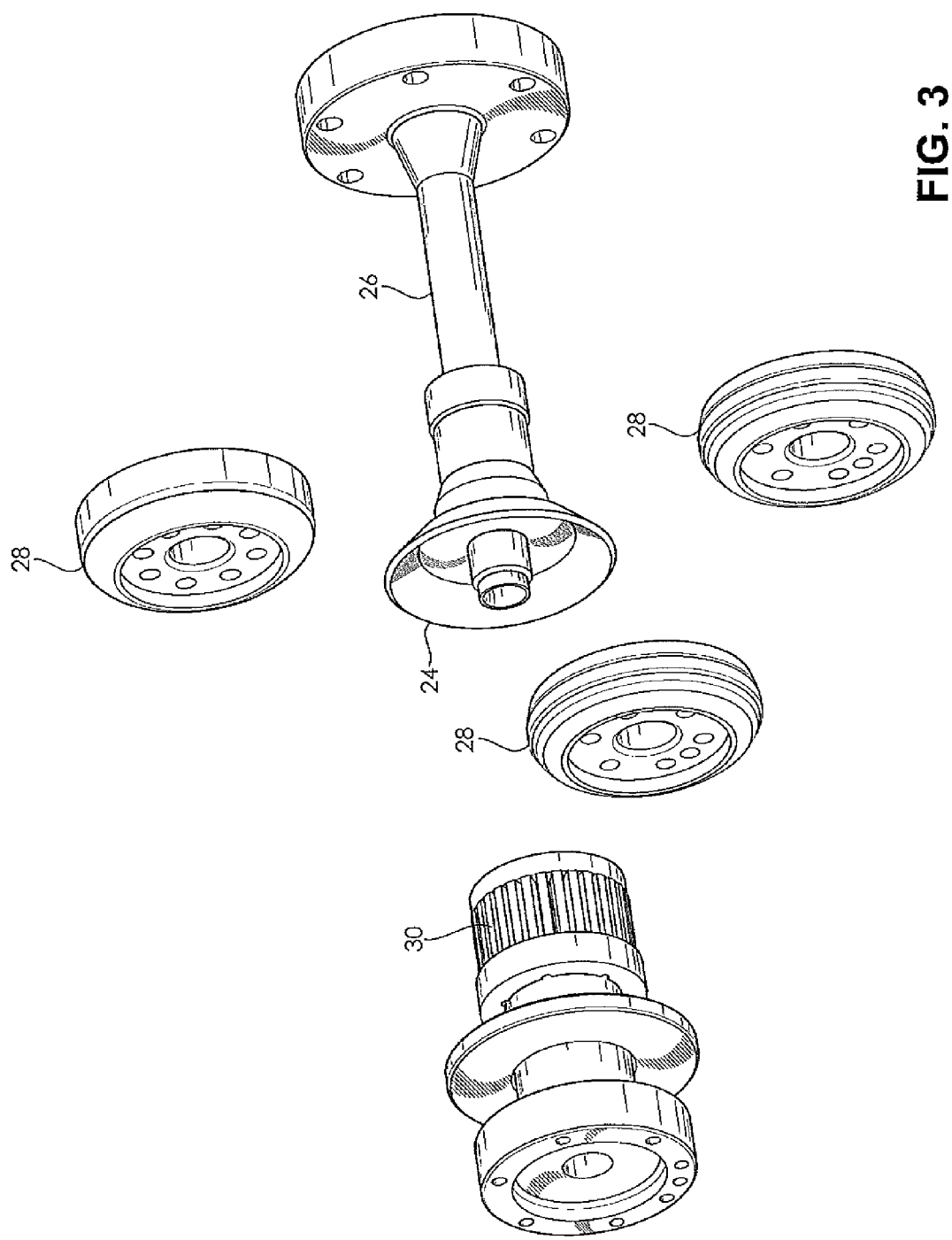
FIG. 3 an exploded perspective view of a system used to produce the flow formed part illustrated in FIG. 1.

To form the part 10, the preform 24 is disposed on a tailstock 26, for example, as shown in FIG. 3. A plurality of rollers 28 disposed adjacent the tailstock 26 is caused to contact the preform 24 during the flow forming process. The preform 24 is pressed against a mandrel 30 having a desired design by the rollers 28.

As shown in FIG. 4, an outer surface of the mandrel 30 may have a plurality of alternating channels 31 and protuberances 33 in a configuration that results in the desired burr free profile 22 of the part 10 after the windows 19 have been punched. Each protuberance 33 may include a surface 34 having a first portion extending out from one adjacent channel 31, a second portion extending out from another adjacent channel 31, and a third portion extending between the first portion and the second portion. The third portion may be substantially planar or non-planar, and may have a slight curvature. The surface 34 between the first and third portions and the second and third portions of each protuberance 33 forms a rounded edge or corner. The rounded edge or corner may have any degree of curvature appropriate for resulting in a burr free profile 22 of the part 10 after the windows 19 have been punched. Each channel 31 may include a planar surface 35 having a portion 36 that concaves outwardly or inwardly. Each channel 31 is integrally connected to an adjacent protuberance 33 by a rounded edge or corner. Each protuberance 33 and channel 31 of the mandrel 30 form a mirror-image channel 21 and protuberance 23 on the part 10 when the preform 24 is pressed against the mandrel 30.

The mandrel 30 may also include a portion adapted to form the reinforcing member 16 around the preform 24. In other embodiments, the reinforcing member 16 is defined by a subsequent process where the windows 19 are formed. The mandrel 30 is adapted to form a window-free flow formed drum 32, as shown in FIG. 5.

The windows 19 are then formed in the window-free flow formed part 32, by secondary manufacturing processes such as either a punching process or a machining process. Other processes suitable for forming the windows 19 may also be employed within the scope of the disclosure.

After the material is removed the flow formed part 32 and the windows 19 are formed, the flow formed part 10 with the reinforcing member 16 and a substantially burr free profile 22, is complete.

Advantageously, the profile 22 formed on the preform 24 by the mandrel 30 during the formation of the part 32, results in a unique flow formed part geometry on the inner surface 17 that allows for a minimized number of burrs and/or other surface flaws on the part 10 after the windows 19 have been punched. Accordingly, production costs are lowered, and the efficiency of the flow forming process is maximized. Additionally, the reinforcing member 16 provides additional stability and strength to the flow formed part 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A flow formed part comprising:
a first end and a second end, wherein the first end is substantially closed and the second end is open;
a side wall extending between the first end and the second end having an inner surface with a profile including a plurality of alternating channels and protuberances, wherein a window is formed in each of the channels between adjacent ones of the protuberances; and
an integral reinforcing member disposed around the second end.

2. The flow formed part according to claim 1, wherein the profile of the inner surface of the side wall permits the formation of substantially burr free windows in the part, and wherein the part is a drum having a substantially cylindrical shape.

3. The flow formed part according to claim 2, wherein the reinforcing member has an outer diameter greater than an outer diameter of the side wall.

4. The flow formed part according to claim 3, wherein the reinforcing member is integrally formed with the side wall.

5. The flow formed part according to claim 1, wherein each window has a substantially rectangular shape.

6. The flow formed part according to claim 1, wherein the first closed end includes at least one aperture.

7. The flow formed part according to claim 1, wherein each protuberance includes a surface having a first portion extending outwardly from one adjacent channel, a second portion extending outwardly from another adjacent channel, and a third portion connecting the first portion and the second portion, the third portion being substantially planar and having a concave portion.

8. The flow formed part according to claim 1, wherein the sidewall is cylindrical in shape and the alternating pattern of channels and protuberances extends annularly around the inner surface of the side wall, wherein each channel is connected to each adjacent protuberance by a rounded interior corner.

9. The flow formed part according to claim 7, wherein the first portion of the surface of each protuberance is connected to a first adjacent channel by a first rounded interior corner and the second portion of the surface of each protuberance is connected to a second adjacent channel by a second rounded interior corner.

* * * * *